United States Patent [19]

Blackwell et al.

[11] Patent Number: 5,805,925
[45] Date of Patent: Sep. 8, 1998

[54] APPARATUS AND METHOD FOR CONTROLLING AND VARYING MULTIPLE DATA RATES AMONG MULTIPLE COMMUNICATIONS DEVICES IN A COMMUNICATIONS SYSTEM

[75] Inventors: Steven R. Blackwell, Huntsville; Richard A. Gautreaux, II, Cullman; Douglas D. Reed, Meridianville, all of Ala.

[73] Assignee: Motorola Inc., Schaumburg, Ill.

[21] Appl. No.: 572,203

[22] Filed: Dec. 13, 1995

[51] Int. Cl.$^6$ .................................................. G06F 3/00
[52] U.S. Cl. ........................................ 395/831; 395/849
[58] Field of Search ..................... 384/239.1; 395/831, 395/849

[56] References Cited

U.S. PATENT DOCUMENTS

| | | | |
|---|---|---|---|
| 3,950,735 | 4/1976 | Patel ........................................ | 395/880 |
| 4,334,307 | 6/1982 | Bourgeois et al. ................. | 395/183.21 |
| 4,787,030 | 11/1988 | Harter et al. ............................ | 395/405 |
| 5,491,804 | 2/1996 | Heath et al. ............................ | 395/275 |
| 5,509,138 | 4/1996 | Cash et al. ......................... | 395/497.01 |
| 5,628,027 | 5/1997 | Belmont .................................. | 395/821 |

*Primary Examiner*—Thomas C. Lee
*Assistant Examiner*—Anderson I. Chen
*Attorney, Agent, or Firm*—Nancy R. Gamburd; John W. Powell

[57] ABSTRACT

A data communications system (10) has a system management controller (100) and multiple data communications devices (21-1 through 21-n). The system management controller has a processor (110) and random access memory (115). The various data communications devices (21-1 through 21-n) are coupled to the system management controller (100) through a common address bus (12) and a common management bus (11). Through the processor (110), the system management controller (100) sequentially addresses each of the data communications devices (21-1 through 21-n) at a default data rate and determines a requested data rate for each device (FIG. 6, 305–333). The system management controller (100), through the processor (110), stores this requested data rate information, correlated with the address of each data communication device, in the random access memory (115) (FIG. 6, 305), and communicates with each such device at its requested data rate (FIG. 6, 335; FIG. 10, 500–545). In the event of errors, both the system management controller (100) and the addressed data communications device revert to a default data rate (FIG. 9, 435; FIG. 10, 525).

14 Claims, 6 Drawing Sheets

| PID FRAME SPEED BYTE | UART DATA RATE (IN BPS) | UART CONTROL REG. VALUE |
|---|---|---|
| 0 | 19200 | 52 |
| 1 | 38400 | 25 |
| 2 | 57600 | 17 |
| 3 | 76800 | 12 |
| 4 | 115200 | 08 |
| 5 | 124500 | 07 |
| 6 | 172800 | 05 |
| 7 | 204800 | 04 |
| ⋮ | ⋮ | ⋮ |

FIG.7

| DEVICE SLOT | PID FRAME SPEED BYTE | UART CONTROL REGISTER VALUE | DEVICE REQUESTED SPEED(BPS) |
|---|---|---|---|
| 1 | 0 | 52 | 19200 |
| 2 | 2 | 17 | 57600 |
| 3 | 0 | 52 | 19200 |
| 4 | 4 | 08 | 115200 |
| 5 | 3 | 12 | 76800 |
| 6 | 5 | 07 | 124500 |
| 7 | 0 | 52 | 19200 |
| 8 | 1 | 25 | 38400 |
| 9 | 0 | 52 | 19200 |
| 10 | 2 | 17 | 57600 |
| ⋮ | ⋮ | ⋮ | ⋮ |
| n | 1 | 25 | 38400 |

APPARATUS AND METHOD FOR CONTROLLING AND VARYING MULTIPLE DATA RATES AMONG MULTIPLE COMMUNICATIONS DEVICES IN A COMMUNICATIONS SYSTEM

FIELD OF THE INVENTION

This invention relates in general to data communications systems, and more particularly, to an apparatus and method for controlling and varying data rates among multiple data communications devices in a data communications system.

BACKGROUND OF THE INVENTION

A data communications system may consist of a number of data communications devices ("DCDs"), such as analog modems, digital modems, and ISDN terminal adapters. The data communications system may be further connected to a local area network or other telecommunications networks, and also connected to a variety of data terminal equipment ("DTE") such as personal computers, workstations, and mainframe computers. In such data communications systems, a system manager or controller may manage the flow of data and other operations between and among the various DCDs, networks, and other DTEs.

One such data communications system is the Motorola 925 system. The Motorola 925 system consists of up to 36 DCDs, which may be analog or digital modems, terminal adapters, or any other type of data communications device. The DCDs are manufactured and configured as cards mounted in a rack-like device, and are centrally controlled by a controller, also manufactured and configured as a card, and referred to as a system management controller ("SMC"). A variety of inventions incorporated in the Motorola 925 system and disclosed in pending United States patent applications include, and are hereby incorporated by reference, with priority claimed for all commonly disclosed subject matter:

(a) Ser. No. 08/505,425, entitled "Method and Apparatus for Storing and Restoring Controller Configuration Information in a Data Communications System", filed Jul. 21, 1995; still pending (b) Ser. No. 08/278,293, entitled "Contention Resolution Method for a Shared Access Bus", filed Jul. 21, 1994 now abandoned;

(c) Ser. No. 08/278,296, entitled "Communication System with Serial Contention Resolution and Parallel Data Bus", filed Jul. 21, 1995 now abandoned; and (d) Ser. No. 08/285,260, entitled "Advanced Communication System Architecture", filed Aug. 3, 1994 now abandoned.

In the prior art, communications between the system management controller and each of the DCDs has typically occurred at one predetermined, fixed data rate, such as 19.2 kbps (kilobits per second). For many if not most applications, such as for transmission of typical commands from the SMC to a DCD card, the predetermined, fixed data rate has been sufficient. Other and newer applications, however, may include, for example, reconfiguring the various DCDs with entirely new or revised digital signal processing code or new systems protocols, which may consist of voluminous files. Reconfiguring each DCD with such voluminous files, at a rate of 19.2 kbps, may be very time consuming and correspondingly inefficient.

Accordingly, it has become highly desirable to provide for higher data communications rates between the SMC and the DCDs. At the same time, however, it is also highly desireable to maintain existing systems and customer investments in such systems. Accordingly, it has also become highly desireable that such data communications systems be retrofittable with new DCDs capable of operating at higher data rates while simultaneously providing for operability within the system of the older or previous DCDs capable of operating only at lower data rates.

DETAILED DESCRIPTION OF THE PRESENT INVENTION

As mentioned above, it has become highly desireable to provide for higher data communications rates between a system management controller and the various data communication devices in the data communications system. At the same time, however, it is also highly desireable that such data communications systems be retrofittable, with new DCDs capable of operating at higher data rates, while simultaneously providing for operability within the system of the older or previous DCDs capable of operating only at lower data rates. As discussed in detail below, the apparatus and method of the present invention provides precisely such capability, allowing for data transfer between the system management controller and the DCDs to occur at any number of different data rates, including high data rates, while simultaneously providing for retrofittability with existing devices.

Figure 1:
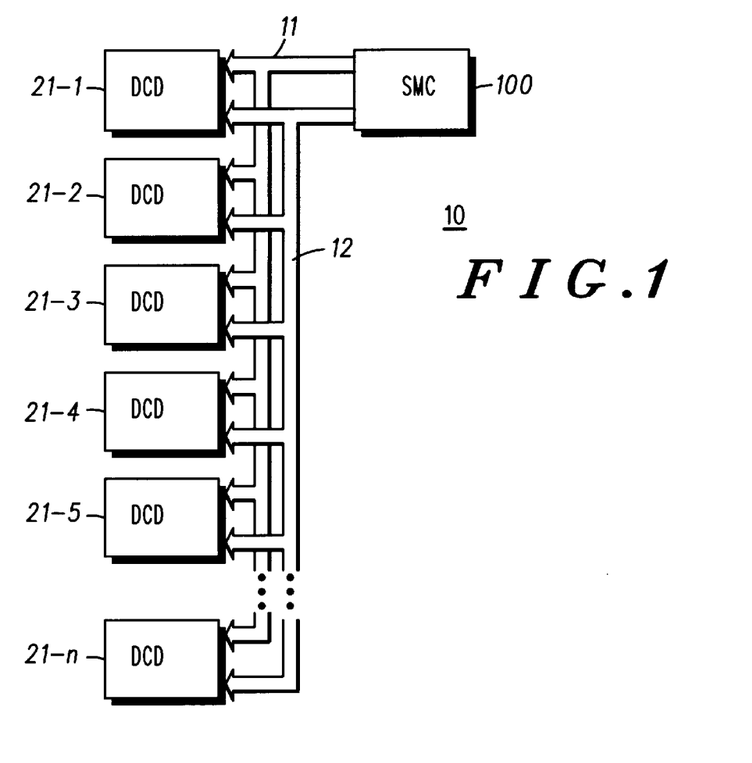
FIG. 1 is a block diagram illustrating a data communications system in accordance with the present invention.

FIG. 1 is a block diagram illustrating a data communications system 10 in accordance with the present invention. The data communications system 10 includes a system management controller (SMC) 100 and a plurality of data communications devices, including a first data communications device 21-1, a second data communications device 21-2, a third data communications device 21-3, a fourth data communications device 21-4, a fifth data communications device 21-5 and so on, through an n$^{th}$ data communications device 21-n. In the preferred embodiment, n=36, such that there are 36 data communications devices in the data communications system 10. The SMC is connected to each DCD of the plurality of DCDs 21-1 through 21-n via a common management bus 11 (also referred to as management bus 11) and a common address bus 12 (also referred to as an address bus 12 or as an address selection bus 12). In the preferred embodiment, the management bus 11 from the SMC 100 to the DCDs 21-1 through 21-n consists of two lines, a transmit line for transferring data and command signals to the DCDs 21-1 through 21-n from the SMC 100, and a receive line for receiving data, responses to command signals and other information from the DCDs 21-1 through 21-n to the SMC 100. In the preferred embodiment, the address bus 12 consists of six lines connected between the SMC 100 and the DCDs 21-1 through 21-n, and is utilized to uniquely address each individual DCD. As illustrated in greater detail in FIG. 6, each DCD of the plurality of DCDs 21-1 through 21-n is "hard-wired" with a given, unique address, having a corresponding six lines, each of which is connected or tied to a high or low voltage. The corresponding six lines of each DCD are exclusive-ORed with the six address lines (of the address bus 12) in an address selection block. The output of the address selection block provides an enable (or enable signal) only to the particular, addressed DCD for information which may be on the management bus 11, and thereby enables uniquely the transfer of data and other information via the management bus 11 to the particular, addressed DCD and only that particular, addressed DCD (of the plurality of DCDs 21-1 through 21-n). The individual or particular DCD which receives or transmits data on the management bus is only that DCD (of the plurality of DCDs 21-1 through 21-n) which was simultaneously uniquely addressed by the SMC 100 via the address bus 12. By controlling which DCD receives information via the address bus 12, the plurality of DCDs 21-1 through 21-n may share a common management bus 11. Accordingly, a DCD which is being addressed by the SMC 100 via the address bus 12 may be referred to as an addressed data communication device.

Continuing to refer to FIG. 1, in accordance with the present invention, the SMC 100 may communicate with each DCD (of the plurality of DCDs 21-1 through 21-n), at different data rates, over the common management bus 11. As explained in greater detail below, the SMC 100 transmits a "request identification protocol frame" (also referred to as a request identification frame) via the management bus 11 to an addressed DCD, i.e., a DCD which is then currently being enabled via the address bus 12). The addressed DCD (still being enabled) responds by transmitting a "present identification protocol frame" (also referred to as a present identification frame) to the SMC 100 via the management bus 11. The present identification frame from the DCD contains information representing or concerning the preferred or requested data rate of the DCD. For example, a present identification frame from DCD 21-5 may contain information that its preferred or requested data rate is 57.6 kbps, while a present identification frame from DCD 21-2 may contain information that its preferred or requested data rate is 19.2 kbps. Accordingly, thereafter and until an error may occur, when the SMC 100 transfers information to and from DCD 21-5 via the management bus 11, it does so at the requested data rate of 57.6 kbps while simultaneously uniquely addressing DCD 21-5, and no other DCD of the plurality of DCDs 21-1 through 21-n. Correspondingly, when the SMC 100 transfers information to and from another DCD, such as DCD 21-2, also via the management bus 11, it does so at that device's requested data rate, such as 19.2 kbps, while simultaneously uniquely addressing only that DCD (such as DCD 21-2), and no other DCD of the plurality of DCDs 21-1 through 21-n.

Figure 2:
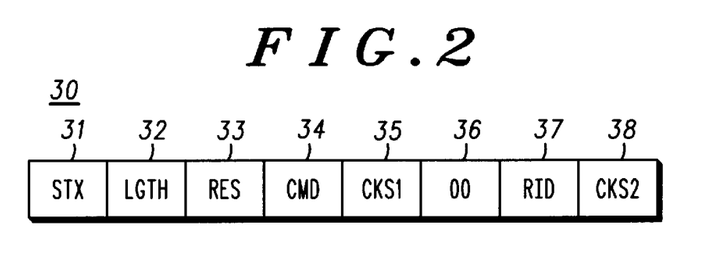
FIG. 2 is a diagram illustrating a request identification protocol frame in accordance with the present invention.

FIG. 2 is a diagram illustrating a request identification (RID) protocol frame 30 in accordance with the preferred embodiment of the present invention. As illustrated in FIG. 2, the request identification frame 30 is a digitally encoded frame or portion of information, beginning with a start of text byte, STX 31. Following STX 31 is LGTH 32, which is a byte indicating the number of bytes following CKS1 35; RES 33, a byte currently reserved for a future use; CMD 34, a byte indicating a command frame; and CKS1 35, an error correction byte which, in the preferred embodiment, is a checksum of the first four (previous) bytes. Following the checksum byte CKS1 35 is byte 36, currently unused; the byte RID 37, which is a request identification command; followed by another error correction byte, CKS2, which is a checksum of the bytes following CKS1 35.

Figure 3:
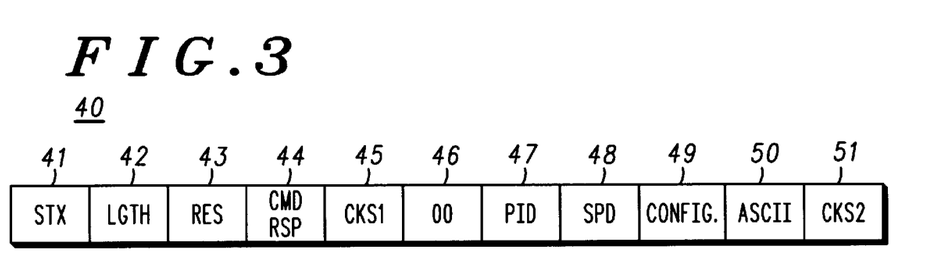
FIG. 3 is a diagram illustrating a present identification protocol frame in accordance with the present invention.

FIG. 3 is a diagram illustrating a present identification (PID) protocol frame 40 in accordance with the preferred embodiment of the present invention. Similarly to the RID frame 30 of FIG. 2, the PID frame 40 also is a digitally encoded frame or portion of information, beginning with a start of text byte, STX 41; also followed by LGTH 42, which is also a byte indicating the number of bytes following CKS1 45; and RES 43, also a byte currently reserved for a future use. Following byte RES 43 is CMD RSP 44, a byte which indicates a command response; CKS1 45, also an error correction byte which is a checksum of the first four (previous) bytes; byte 46, also currently unused; the byte PID 47, which is a present identification response; SPD 48, which is a speed byte indicating the preferred data rate of the individual DCD. Typically, as discussed in greater detail below, the speed byte SPD 48 will indicate (or digitally encode) the maximum data rate of the universal asynchronous receiver-transmitter (UART) contained within the DCD, as defined within the given protocol. For example, in the preferred embodiment, a zero value as speed byte SPD 48 is defined as a default data rate which, for example, may be 19.2 kbps. This also allows for retrofittablility with existing devices which operate at the default data rate, as these devices already have been programmed with a protocol to have a zero value as the speed byte SPD 48. Following the byte SPD 48 is a configuration byte, CONFIG 49, as disclosed in a previous application (Ser. No. 08/505,425, entitled "Method and Apparatus for Storing and Restoring Controller Configuration Information in a Data Communications System"), which indicates a number of random access memory (RAM) pages of configuration information which may be stored in the DCD. Next are bytes referred to as ASCII 50, which contain ASCII code (characters) with a name or description of the particular DCD; and another error correction byte, CKS2 51, which is also a checksum byte of the previous bytes following CKS1 45.

Figure 4:
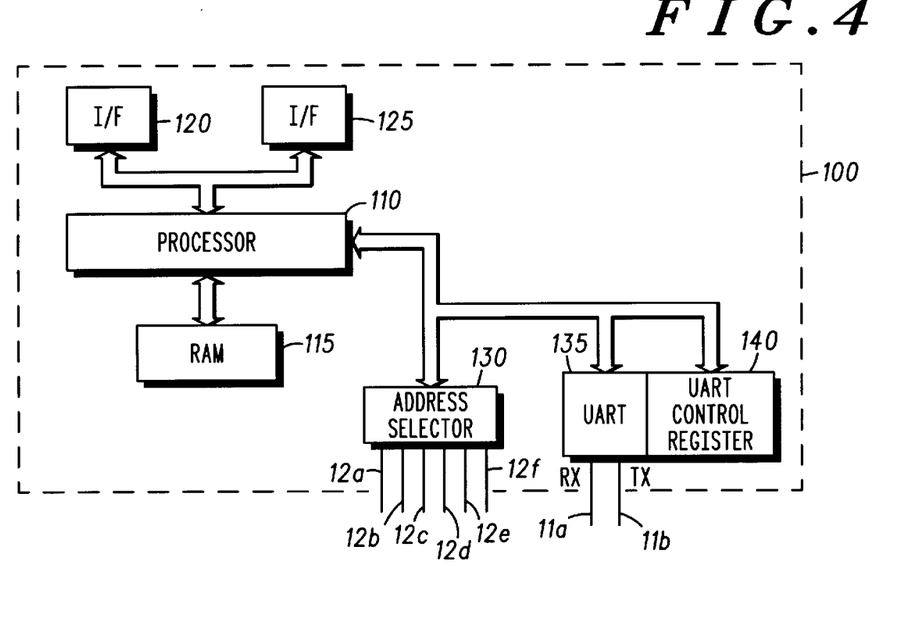
FIG. 4 is a block diagram illustrating a system management controller in accordance with the present invention.

FIG. 4 is a block diagram illustrating a system management controller 100 having data rate selection capability in accordance with the present invention. As illustrated in FIG. 4, the SMC 100 has a processor (or, equivalently, a microprocessor or other microcontroller) 110, such as a Motorola 68302 processor. The processor 110 also typically contains read only memory (ROM) for storage of program instructions to be executed by the processor 110. Coupled or coupleable to the processor 110 are interface circuits 120 and 125 which, for example, may be an RS232 interface for connection to a user interface such as a controller display unit, or a network interface (such as a National Semiconductor Sonic-T chip) for connection to a network. Also connected to the processor 110 is a random access memory (RAM) 115, of any type known or preferred in the art, and an address selector block 130, typically a latch (such as a 74HC374). The address selector block 130 may also be incorporated within the processor 110, and is coupled to the address bus 12, illustrated as six individual conductors (or lines) 12a–12f. The processor 110 also typically contains (in the preferred Motorola 68302), or is alternatively connected to, a universal asynchronous receiver-transmitter (UART) 135 (separately illustrated in FIG. 4 for ease of explanation only). The UART 135 (whether as a separate block or as contained within a processor) also typically has a UART control register 140, which is utilized to store information for the UART to operate at different data rates. The UART 135 (and UART 215, below) also interconverts parallel data from (to) the processor 110 (or processor 210, below) to (from) serial data transferred on the management bus 11. The UART 135 (or UART portion of the processor 110) is connected to the management bus 11, also illustrated in FIG. 4 as two separate receive and transmit lines, 11a and 11b, respectively. The operation of the SMC 100 is discussed in greater detail below with reference to FIGS. 6–10.

Figure 5:
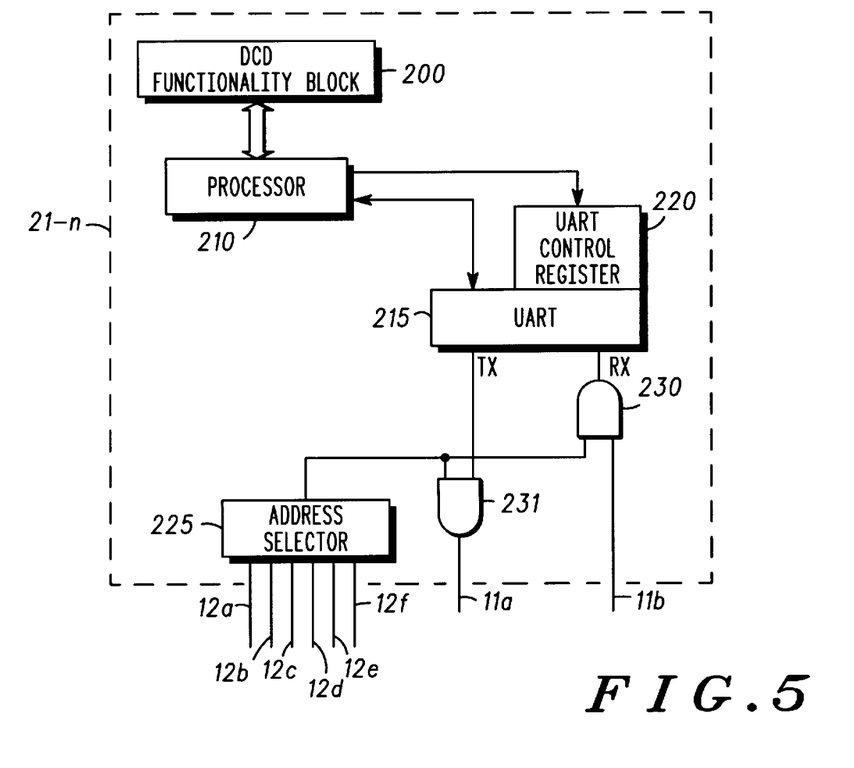
FIG. 5 is a block diagram illustrating a data communications device in accordance with the present invention.

FIG. 5 is a block diagram illustrating a data communications device 21-n in accordance with the present invention. As mentioned above, the DCD 21-n may be any type of data communications device, such as an analog modem, a digital modem, or an ISDN terminal adapter, with corresponding hardware (such as a digital signal processor, RAM, and corresponding interfaces and drivers), and software generically and inclusively illustrated as DCD functionality block 200. Connected to the DCD functionality block is a processor 210, which also may be a Motorola 68302 processor. Again, similar to the SMC 100, either connected to or contained within the processor 210 is a UART 215, also having a UART control register 220 for storing information concerning the data rate (speed) of the UART 215. Illustrating the enabling function of the address selection block 225, the UART 215 is illustrated as gated by the address selection block 225, via AND gates 230 and 231, which have as their inputs the output from the address selection block and, respectively, a receive line 11b (transmitted from the SMC 100) and a transmit line 11a (to be received by the SMC 100) of the management bus 11. As mentioned above, the address selection block 225 is coupled to the address bus 12, and the individual, unique address of each DCD, such as DCD 21-n, is controlled by hard-wiring a corresponding six lines to either high or low voltages. The operation of the DCD 21-n in accordance with the present invention is also explained below with reference to FIGS. 6–10.

Figure 6:
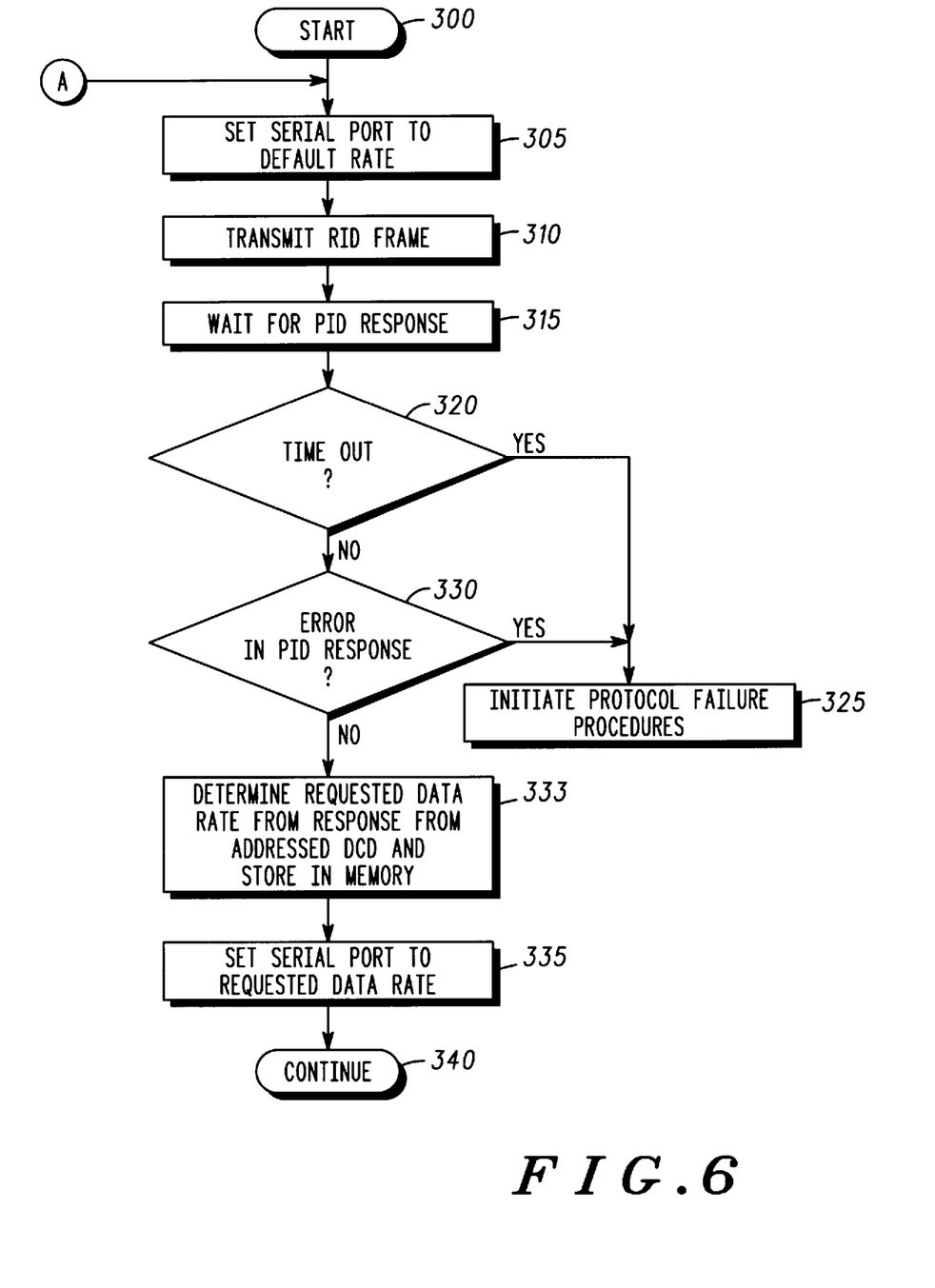
FIG. 6 is a flow diagram illustrating a method for a system management controller to select and operate at a variable speed in accordance with the present invention.

FIG. 6 is a flow diagram illustrating a method for a system management controller 100 to select and operate at a variable speed in accordance with the present invention. Beginning with start step 300, the SMC 100 (through the processor 110) sets the serial port (of the UART 135) to the default data rate, such as 19.2 kbps, step 305. The SMC 100 is controlled by the processor 110 and the set of program instructions stored in ROM, such that all references to processes performed by the SMC 100 should be construed to mean processes performed by the SMC 100 under the direction and control of the processor 110. The SMC 100, also through the processor 100 and UART 135, transmits a request identification frame to a DCD of the plurality of DCDs 21-1 through 21-n, which the SMC 100 has addressed and enabled through the address bus 12, step 310. The RID frame is transmitted to the addressed DCD at the default data rate, and the SMC 100 will continue to communicate with the addressed DCD at the default data rate until the SMC 100 receives a (valid) requested data rate from the DCD. The SMC 100 (also via the processor 110) waits for a response, such as a present identification frame, from the addressed DCD, step 315. If the addressed DCD does not respond within a predetermined period of time and "timeout" occurs, step 320, or if an error occurs in the PID response, step 330, the SMC 100 initiates protocol failure procedures, step 325, such as repeating steps 305–315 and, if still unsuccessful, not polling the addressed device until a message is received from the addressed DCD. If a timeout has not occurred in step 320, and if there is no error in the PID response in step 330, the processor 110 (of the SMC 100) reads the PID and determines the requested data rate for the addressed DCD, stores this information in memory (RAM 115), step 333, and sets the serial port to the requested data rate, as indicated in speed byte SPD 48 of the PID 40, step 335. This is accomplished by the processor 110 transmitting corresponding information to the UART 135, which is then stored in the UART control register 140. The process then continues, step 340, either with other processes, such as data transfer to the DCD, or with repeating steps 300 through 340 for other DCDs.

Figure 7:
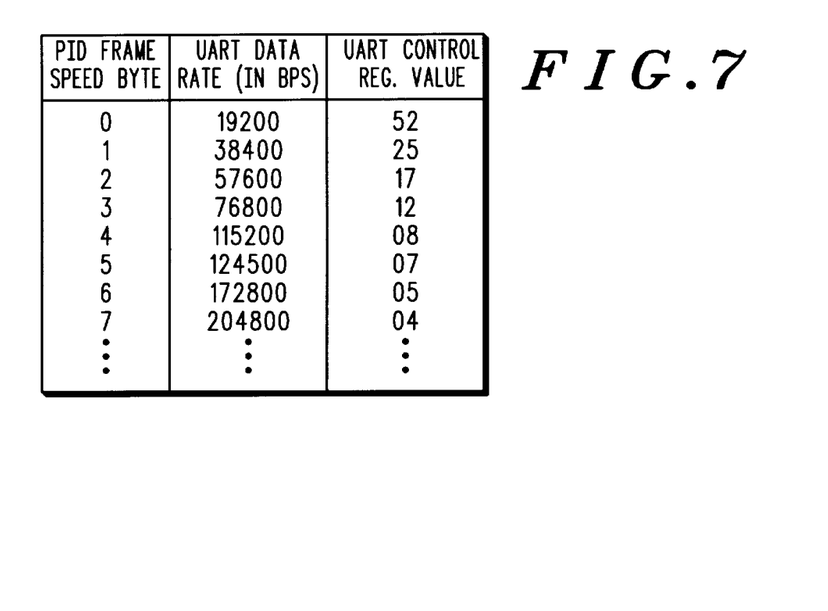
FIG. 7 is a diagram illustrating in tabular form a correlation of present identification frame speed bytes, data rates, and UART control register values in accordance with the preferred embodiment of the present invention.

FIG. 7 is a diagram illustrating in tabular form a correlation of present identification (PID) frame speed bytes, data rates, and UART control register values in accordance with the preferred embodiment of the present invention, which may be stored in RAM 115. The first column of FIG. 7 illustrates representative speed bytes SPD 48 of the PID 40 utilized by the DCD and read by the processor 110, to indicate a corresponding preferred or requested data rate for the UARTs 215 and 135, which are illustrated in column 2 of FIG. 7. The third column of FIG. 7 illustrates a corresponding value transmitted by the processor (110 and 210) to the UART (135 and 215) and stored in the UART control register (140 and 220), for the UART to operate at the corresponding data rate. As an example, in the preferred embodiment, the processor 110 may read a value of "3" in the byte SPD 48 of the PID 40 received from, for example, DCD 21-n. The value of 3 in the byte SPD 48 corresponds to a requested data rate of 76.8 kbps and, accordingly, the processor 110 transmits a value of 12 to the UART, to set the UART serial port to the requested data rate. This value is also stored in the UART control register 140 until replaced by another value, for example, a default value if an error occurs. Similar values are also correspondingly utilized by the UART 215 and stored in the UART control register 220 of the DCD, such as DCD 21-n, as discussed below with reference to FIG. 9.

Figure 8:
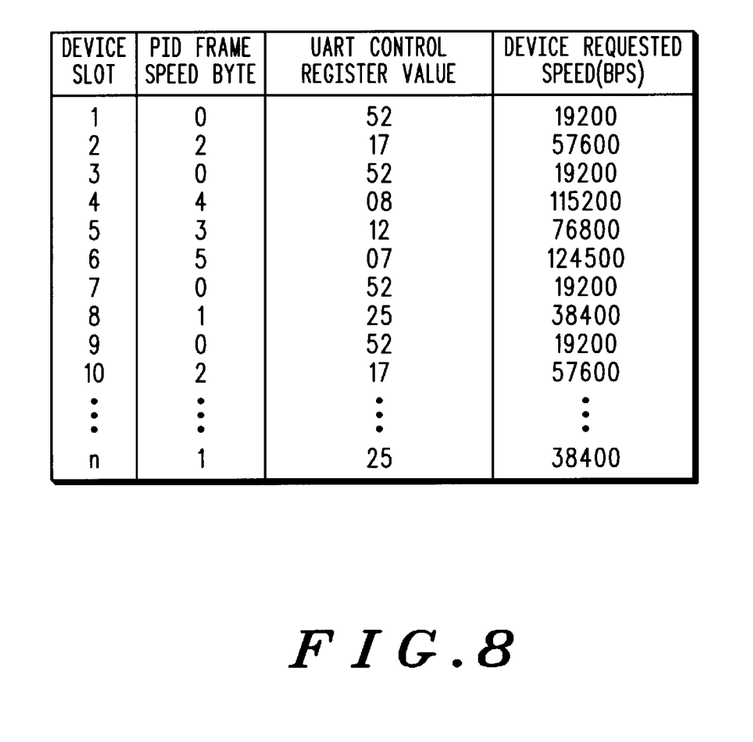
FIG. 8 is a diagram illustrating in tabular form an example of a device speed reference table for a data communications system in accordance with the preferred embodiment of the present invention.

As the SMC 100 repeats steps 300–340 of FIG. 6 for the other DCDs (of the plurality of DCDs 21-1 through 21-n of the data communication system 10), the SMC will acquire corresponding requested data rate information for each DCD. This requested data rate information from each DCD, correlated with each DCD's unique address, may be stored, for example, in a tabular or array format, in the RAM 115. FIG. 8 is a diagram illustrating in tabular form an example of a device speed reference array, stored in RAM 115 of the SMC 110, for a data communications system in accordance with the preferred embodiment of the present invention. Referring to FIG. 8, in column one, each DCD is identified by its address, a slot number 1 through n in the preferred embodiment, with its corresponding speed byte SPD 48 read from the received PID illustrated in column two. Each speed byte SPD 48 is correlated with a UART control register value in column three, and a corresponding requested data rate in column four. For example, the DCD in slot n transmitted a speed byte SPD 48 value of 1, indicating that the processor 110 should transmit a value of 25 to the UART 135 (and corresponding UART control register 140), for a requested data rate of 38.4 kbps.

Figure 9:
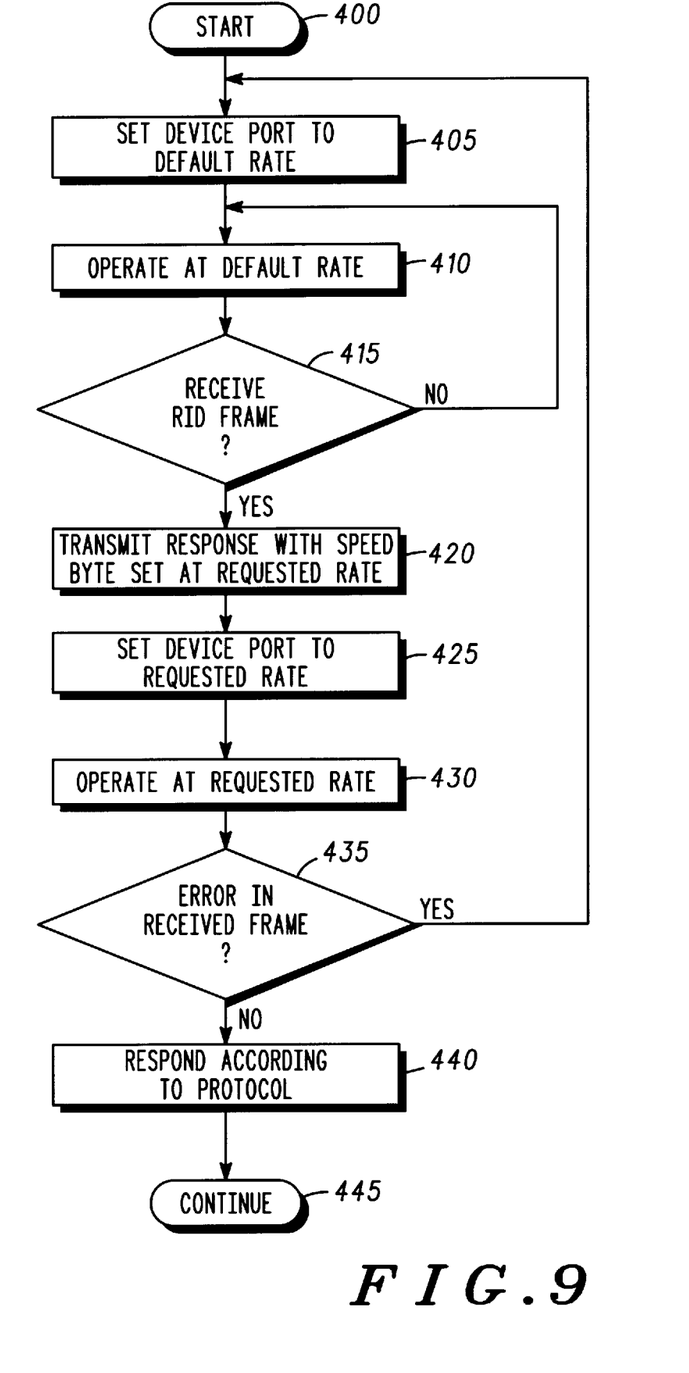
FIG. 9 is a flow diagram illustrating a method for a data communications device to select and operate at a variable speed in accordance with the present invention.

FIG. 9 is a flow diagram illustrating a method for a data communications device to select and operate at a variable speed in accordance with the present invention. Beginning with start step 400, the DCD sets its serial device port (of its corresponding UART 215) to the default data rate. For older devices, this may be its only data rate. The DCD, such as DCD 21-n, operates at this default rate, step 410, until it receives a request identification frame from the system controller 100 on the management bus 11, as enabled by the address bus 12, step 415. When the DCD has received a RID frame from the system controller 100 in step 415, the DCD transmits its response to the system controller 100, consisting of a present identification frame 40 with the speed byte SPD 48 set to the desired or preferred data rate, step 420. The DCD then sets its serial device port (of its corresponding UART 215) to its requested data rate (and similarly stores a corresponding value in the UART control register 220), step 425. The DCD then operates at the requested data rate when transferring data or other information to or from the SMC 100 over the management bus 11, step 430, unless an error is found by the DCD in information received from the SMC 100, such as an error in a received command frame, step 435. If such an error occurs in step 435, the DCD returns to step 405 and resets it serial device port to the default data rate, and continues to operate at the default data rate (step 410) until it receives another RID frame, step 415, repeating the process through step 435. If there are no errors in information received from the SMC 100 in step 435, the DCD responds appropriately according to the protocol implemented in the data communication system, step 440, and the process continues, step 445.

Figure 10:
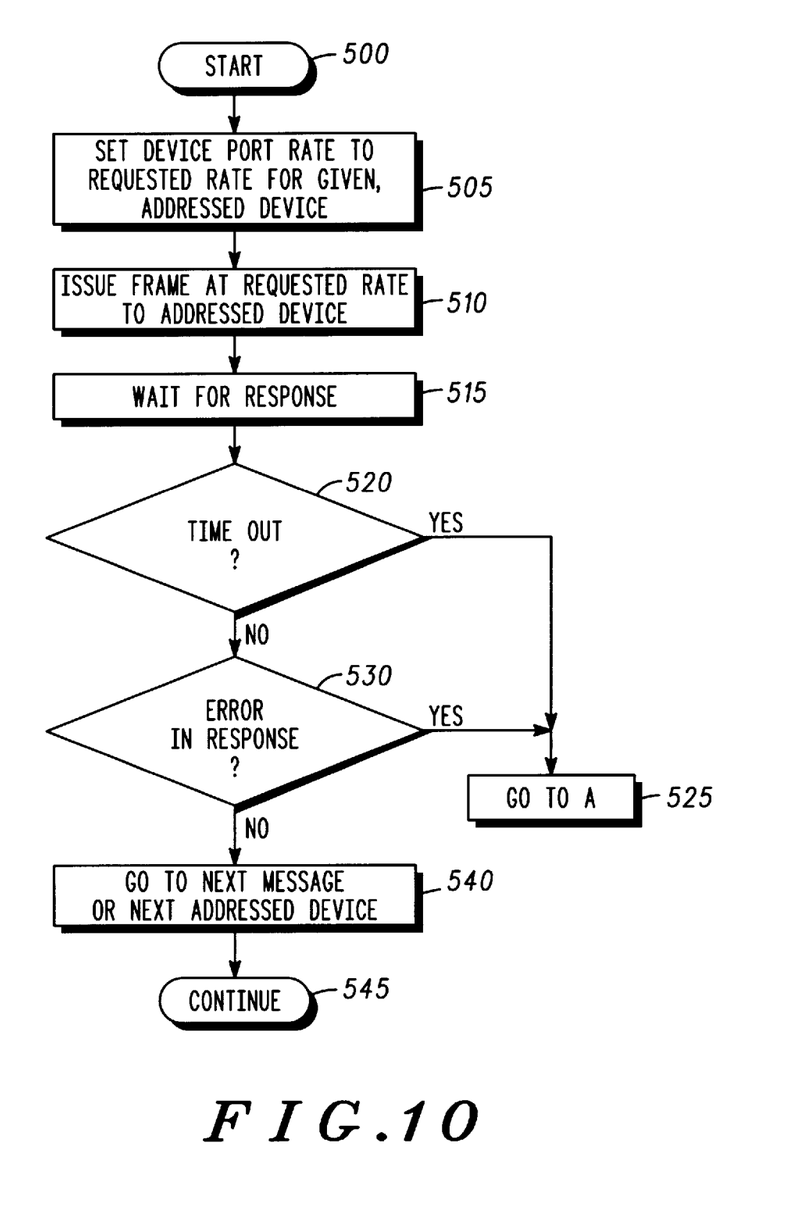
FIG. 10 is a flow diagram illustrating a method for a system management controller to return to a default data rate, in the event of system errors, in accordance with the present invention.

FIG. 10 is a flow diagram illustrating a method for a system management controller 100 to return to a default data rate, in the event of system errors, in accordance with the present invention. Because such errors may occur due to various devices losing synchronization or due to other causes, in such events, both the affected DCD and the SMC 100 (for the given, addressed device) will reset their data rates to default values, and re-initialize utilizing the procedures illustrated in FIGS. 6 and 9. Referring to FIG. 10, beginning with start step 500, the SMC 100 sets its serial device port (in the UART 135) to the preferred or requested data rate for a given, addressed DCD, step 505. This portion of the method of the present invention presumes that the initial procedures illustrated in FIGS. 6 and 9 have occurred previously, namely, that the SMC 100 has polled all DCDs 21-1 through 21-n, has determined each DCD's requested data rate, and has stored that information in RAM 115 in a form, for example, illustrated in FIG. 8. Accordingly, having set its serial device port to the requested data rate for the given device in step 505, the SMC 100 transmits a frame, for example, a command frame, to the given (uniquely addressed) DCD, step 510, and waits for a response, step 515. If the addressed DCD does not respond within a predetermined period of time and "timeout" occurs, step 520, or if an error occurs in the DCD's response to the transmitted frame, step 530, the SMC 100 returns to step 305 illustrated in FIG. 6 (step 525, "GO TO A"). Returning to step 305, the SMC resets its serial port to the default data rate, and proceeds with the remaining steps illustrated in FIG. 6. Similarly, not having properly responded to the frame from the SMC 100, the addressed DCD will have found some type of error in the received frame (or at a minimum will find such an error in the next received frame transmitted at the default rate and not the expected requested rate) (FIG. 7, step 435), will have also reset its serial data port to the default data rate (FIG. 9, step 405), and will also proceed with the remaining steps illustrated in FIG. 9. Conversely, if a timeout has not occurred in step 520, and if there is no error in the DCD's response in step 530, the processor 110 (of the SMC 100) utilizes the response according to its protocol, and may proceed with a next message to the same DCD or proceed with a message to another DCD, step 540, and the process continues, step 545.

In summary, FIGS. 1 and 4 disclose an apparatus, such as an SMC 100, for controlling and varying a plurality of data rates among a plurality of data communications devices 21-1 through 21-n in a data communications system 10, the plurality of data communications devices 21-1 through 21-n coupled to a common management bus 11 and to a common address bus 12. The apparatus then comprises, first, a random access memory 115; and second, a processor 110 coupled to the random access memory 115, with the processor further coupleable to the common management bus 11 and to the common address bus 12. The processor 110 is responsive through a set of program instructions, typically stored in ROM, to transmit an identification request on the common management bus 11 at a default data rate to an addressed data communications device (steps 305–310), with the processor 110 further responsive to receive at the default data rate a response to the identification request from the addressed data communications device (step 315), the processor further responsive to determine a requested data rate from the response and to store in the random access memory the requested data rate correlated with an address location of the addressed data communications device (step 333), and the processor 110 further responsive to transfer data to and from the addressed data communications device at the requested data rate on the common management bus 11 (steps 335–340).

Also in summary, and as illustrated in the formation of FIG. 8 through the repetition of the steps of FIGS. 6 and 9, the processor 110 of the SMC 100 is further responsive to sequentially transmit the identification request at the default data rate to each data communications device of the plurality of data communications devices 21-1 through 21-n; to correspondingly receive at the default data rate a sequence of responses from each of the plurality of data communications devices 21-1 through 21-n; to determine from the sequence of responses and to store in the random access memory a plurality of corresponding requested data rates, with each requested data rate of the plurality of corresponding requested data rates correlated with an address location corresponding to each of the plurality of data communications devices 21-1 through 21-n (FIG. 8); and the processor 110 further responsive to transfer data to and from each data communications device of the plurality of data communications devices 21-1 through 21-n at each corresponding requested data rate of the plurality of corresponding requested data rates (FIG. 10, steps 500–545).

The method of the present invention may also be summarized as a method for controlling and varying a plurality of data rates among a plurality of data communications devices 21-1 through 21-n in a data communications system 10, with the plurality of data communications devices 21-1 through 21-n coupled to a common management bus 11 and to a common address bus 12. The method then comprises: first, transmitting an identification request on the common management bus at a default data rate to a data communications device of the plurality of data communications devices (steps 305–310); second, receiving at the default data rate a response to the identification request from the data communications device (step 315); third, determining a requested data rate from the response (step 333); fourth, storing in a memory the requested data rate correlated with an address location of the data communications device (step 333); and fifth, transmitting data to and receiving data from the data communications device at the requested data rate on the common management bus (steps 335, 340, 505–545). Also as mentioned above, these steps may be repeated for each data communication device of the plurality of data communications devices 21-1 through 21-n, with the formulation and storage of the information illustrated in FIG. 8. In addition, as illustrated in FIG. 10, the method includes determining validity of data received from each of the plurality of addressed data communications devices (steps 520–530); retransmitting an identification request at the default rate to a data communications device when the data received from the data communications device was invalid (steps 525, 305–315); transferring data to and from a data communications device at the default rate when data previously received from the data communications device was invalid (steps 525, 305–315); and revising and storing in memory the default data rate correlated with the address location of the data communications device when data previously received from the data communications device was invalid (steps 525, 305).

Significant advantages from the present invention may also be apparent. First, the apparatus and method of the present invention are able to provide for higher data communications rates between the SMC and the DCDs, thereby decreasing the time necessary for reconfiguring the DCDs with revised code. In addition, user input to the data communications system would receive a faster response through interfaces such as an RS232 interface connection to a display unit of the system controller or a network connection to a TELNET display. At the same time, the apparatus and method of the present invention are able to provide for maintaining existing systems and customer investments in such systems, because the data communications systems are retrofittable with new DCDs capable of operating at higher data rates while simultaneously providing for operability within the system of the older or previous DCDs capable of operating only at lower data rates.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. An apparatus for controlling and varying a plurality of data rates among a plurality of data communications devices in a data communications system, the plurality of data communications devices coupled to a common management bus and to a common address bus, the apparatus comprising:

a random access memory; and a processor coupled to the random access memory, the processor further coupleable to the common management bus and to the common address bus, the processor responsive through a set of program instructions to transmit an identification request on the common management bus at a default data rate to an addressed data communications device, the processor further responsive to receive at the default data rate a response to the identification request from the addressed data communications device, the processor further responsive to determine a requested data rate from the response and to store in the random access memory the requested data rate correlated with an address location of the addressed data communications device, and the processor further responsive to transfer data to and from the addressed data communications device at the requested data rate on the common management bus;

wherein the processor is further responsive to determine validity of data received from each of the plurality of data communications devices; to retransmit an identification request at the default rate to a data communications device when the processor has determined that data received from the data communications device was invalid; and to revise and store in the random access memory the default data rate correlated with the address location of the data communications device when the processor has determined that data previously received from the data communications device was invalid.

2. The apparatus of claim 1 wherein the processor is further responsive to sequentially transmit the identification request at the default data rate to each data communications device of the plurality of data communications devices, to correspondingly receive at the default data rate a sequence of responses from each of the plurality of data communications devices, the processor further responsive to determine from the sequence of responses and to store in the random access memory a plurality of corresponding requested data rates, with each requested data rate of the plurality of corresponding requested data rates correlated with an address location corresponding to each of the plurality of data communications devices, and the processor further responsive to transfer data to and from each data communications device of the plurality of data communications devices at each corresponding requested data rate of the plurality of corresponding requested data rates.

3. The apparatus of claim 1 wherein the processor is further responsive to form the identification request, to determine an address location corresponding to the data communications device, and to transmit the identification request at the default data rate on the common management bus while simultaneously addressing the data communications device on the common address bus.

4. The apparatus of claim 1 wherein the processor is further responsive to read the response to the identification request, determine the requested data rate, and correlate the requested data rate with an address location corresponding to the addressed data communications device.

5. The apparatus of claim 1 wherein the processor is further responsive to retrieve from the random access memory a requested data rate corresponding to an address location of a data communications device and to transfer data on the common management bus at the requested data rate while simultaneously addressing the data communications device on the common address bus.

6. The apparatus of claim 1 wherein the processor is further responsive to transfer data to and from a data communications device at the default rate when the processor has determined that data previously received from the data communications device was invalid.

7. The apparatus of claim 1 wherein the requested data rate is different from the default data rate.

8. A method for controlling and varying a plurality of data rates among a plurality of data communications devices in a data communications system, the plurality of data communications devices coupled to a common management bus and to a common address bus, the method comprising:

(a) transmitting an identification request on the common management bus at a default data rate to a data communications device of the plurality of data communications devices;

(b) receiving at the default data rate a response to the identification request from the data communications device;

(c) determining a requested data rate from the response;

(d) storing in a memory the requested data rate correlated with an address location of the data communications device;

(e) transmitting data to and receiving data from the data communications device at the requested data rate on the common management bus;

(f) determining validity of data received from the data communication device, (g1) retransmitting an identification request at the default rate to the data communications device when the data received from the data communications device was invalid; and (g2) revising and storing in memory the default data rate correlated with the address location of the data communications device when data previously received from the data communications device was invalid.

9. The method of claim 8, further comprising:

(h) repeating steps (a) through (g), inclusive, for each data communication device of the plurality of data communications devices.

10. The method of claim 8 wherein step (a) further comprises:

(a1) forming the identification request;

(a2) determining an address location corresponding to the data communications device; and (a3) transmitting the identification request at the default data rate on the common management bus while simultaneously addressing the data communications device on the common address bus.

11. The method of claim 8 wherein step (c) further comprises:

(c1) reading the response to the identification request received in step (b);

(c2) determining the requested data rate; and (c3) correlating the requested data rate with an address location corresponding to the data communications device.

12. The method of claim 8 wherein step (e) further comprises:

(e1) retrieving from memory a requested data rate corresponding to an address location of the data communications device;

(e2) transferring data on the common management bus at the requested data rate while simultaneously addressing the data communications device on the common address bus.

13. The method of claim 8 wherein step (g) further comprises:

(g3) transferring data to and from a data communications device at the default rate when data previously received from the data communications device was invalid.

14. The method of claim 8 wherein the requested data rate is different from the default data rate.

* * * * *

UNITED STATES PATENT AND TRADEMARK OFFICE
CERTIFICATE OF CORRECTION

PATENT NO. : 5,805,925
DATED : September 8, 1998
INVENTOR(S) : Steven R. Blackwell, Richard A. Gautreaux II, Douglas D. Reed It is certified that error appears in the above-identified patent and that said Letters Patent is hereby corrected as shown below:

<u>Title page, Item [54] and Column 1, Lines 1-5,</u>
In the title of the invention, delete the title which reads,
"APPARATUS AND METHOD FOR CONTROLLING AND VARYING MULTIPLE DATA RATES AMONG MULTIPLE COMMUNICATIONS DEVICES IN A COMMUNICATIONS SYSTEM" and substitute, -- SYSTEM FOR PROCESSOR RESPONSIVE TO VALIDITY OF DATA RECEIVED RETRANSMITTING IDENTIFICATION REQUEST AT DEFAULT RATE AND REVISE DEFAULT RATE WITH ADDRESS LOCATION OF DEVICE --

Signed and Sealed this

Eighteenth Day of September, 2001

*Attest:*

NICHOLAS P. GODICI
*Attesting Officer*    Acting Director of the United States Patent and Trademark Office